United States Patent [19]

Caveney et al.

[11] Patent Number: 4,919,373
[45] Date of Patent: Apr. 24, 1990

[54] PUSH MOUNT TIE

[75] Inventors: Jack E. Caveney, Hinsdale; Jeffery S. Kuzmuk, Lansing, both of Ill.

[73] Assignee: Panduit Corp.

[21] Appl. No.: 139,528

[22] Filed: Dec. 29, 1987

Related U.S. Application Data

[63] Continuation-in-part of Ser. No. 98,269, Sep. 18, 1987, abandoned.

[51] Int. Cl.$^5$ .......................... B65D 63/00; F16L 3/03
[52] U.S. Cl. .................... 248/74.3; 24/16 PB
[58] Field of Search ............ 248/74.1, 74.5, 73; 24/16 PB, 16 R, 30.5 P

[56] References Cited

U.S. PATENT DOCUMENTS

| | | | |
|---|---|---|---|
| 3,576,054 | 4/1971 | Rynk | 24/16 PB |
| 3,855,670 | 12/1974 | Brudy | 24/10 PB |
| 4,574,434 | 3/1986 | Shupe et al. | 24/16 PB |
| 4,705,245 | 11/1987 | Osada | 240/74.3 |
| 4,766,651 | 8/1988 | Kobayashi et al. | 248/74.3 |

FOREIGN PATENT DOCUMENTS

| | | | |
|---|---|---|---|
| 1777524 | 9/1964 | Fed. Rep. of Germany | 24/16 PB |
| 141127 | 4/1920 | United Kingdom | 24/16 PB |

Primary Examiner—Alvin C. Chin-Shue

[57] ABSTRACT

A one-piece fastener for securing a plurality of elongate objects in a bundle and securing the bundle to an apertured mounting surface includes an elongate flexible strap having a plurality of teeth, the strap being joined to a locking head by a spiral strap portion. The head includes a strap accepting slot, a downwardly disposed pawl that presents a plurality of teeth disposed to engage the strap teeth, a barb means formed on the pawl for resiliently engaging the edge of a mounting aperture and a pressure pawl formed opposite the pawl, the strap being positioned between the pressure pawl and pawl when secured with the locking head.

22 Claims, 4 Drawing Sheets

PUSH-MOUNT TIE

This is a continuation-in-part of application Ser. No. 098,269 filed Sept. 18, 1987, abandoned.

TECHNICAL FIELD

The present invention relates to one-piece fasteners having a strap and a locking head utilized to secure elongate objects such as cables in a bundle and having means for securing the bundled cables to an aperture in a mounting surface.

BACKGROUND ART

A variety of strap fasteners having aperture mounting features have been proposed in the art. See U.S. Pat. No. 2,969,216; U.S. Pat. No. 3,550,219; U.S. Pat. No. 4,435,881 and U.S. Pat. No. 4,572,466. As may be noted in the above mentioned patents, the use of one-piece plastic fasteners to bundle and secure cables or wires to an aperture in a mounting surface is well known in the art. The desirable characteristics of such a fastener include a fastener that minimizes the threading force needed to insert the fastener strap within the locking mechanism of the fastener while maximizing the force needed to withdraw the strap from the locking mechanism of the fastener, a fastener that centers its cable bundle over the mounting aperture within which it is secured, a fastener that maximizes the stability and strength of the attachment to the mounting aperture, and a fastener that can be economically manufactured as a one-piece injection molded part with a simple two plate mold without the need of complex side action mold features.

Although the known fasteners possess some of the desirable characteristics in a fastener, they also possess many undesirable characteristics, leaving room for improvement in the fastener art. One major characteristic needing improvement in prior fasteners is a reduction in the insertion force needed to apply the fastener and thus an improvement in the ease of installation of the fastener.

DISCLOSURE OF THE INVENTION

It is therefore an object of the present invention to provide a push mount tie that minimizes strap threading force to increase the ease of application of the push mount tie without suffering an accompanying reduction of force needed to withdraw the strap from the locking mechanism of the tie.

It is another object of the present invention to provide a push mount tie having a structure specially selected to minimize molding complexity and thus manufacturing costs.

It is an additional object to provide a push mount tie that centers a cable bundle over a mounting aperture.

It is a further object of the present invention to provide a push mount tie that maximizes the stability and strength of the attachment of the tie to a mounting aperture.

In general, the one-piece push mount tie fastener of the present invention includes an elongate flexible strap having a plurality of teeth formed along its length, a head disposed transverse to the strap which includes a strap accepting and positioning slot formed therein, resilient wings projecting downwardly from the head, a pawl having a planar guide surface upon which is formed at least one tooth disposed to engage the teeth on the strap when the strap is inserted in the slot, a resilient barb formed on the pawl for resiliently engaging an edge of a mounting aperture and a pressure pawl projecting downwardly from the head plate opposite the strap guide surface. In preferred form the strap is joined to the head plate by a molded spiral strap portion whereby the push mount tie can be molded in a conventional, simple two plate mold without side action.

PREFERRED EMBODIMENTS FOR CARRYING OUT THE INVENTION

Figure 1:
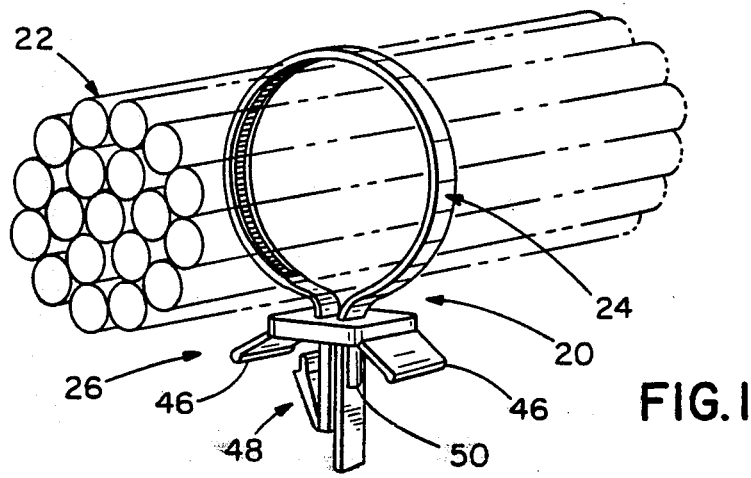
FIG. 1 is a perspective view of a push mount tie embodying the concept of the present invention shown secured around a bundle of cables, with head side slots omitted for clarity.
Figure 2:
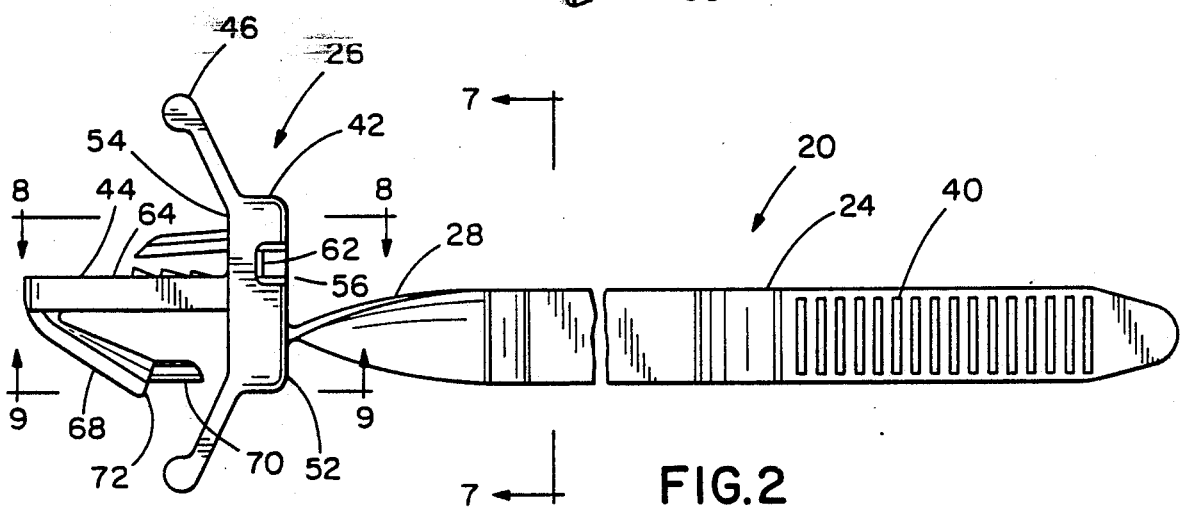
FIG. 2 is a front view of the push mount tie of FIG. 1 in its as-molded condition with a portion of its strap partly cut away.
Figure 3:
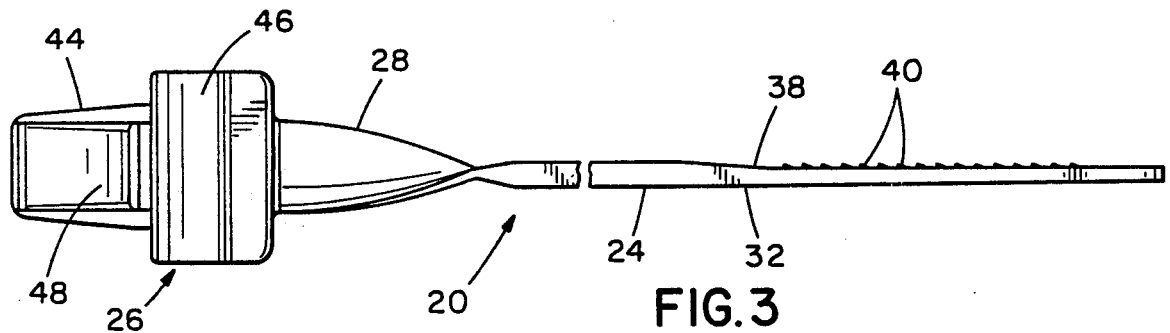
FIG. 3 is a top view of the push mount tie of FIG. 2.
Figure 4:
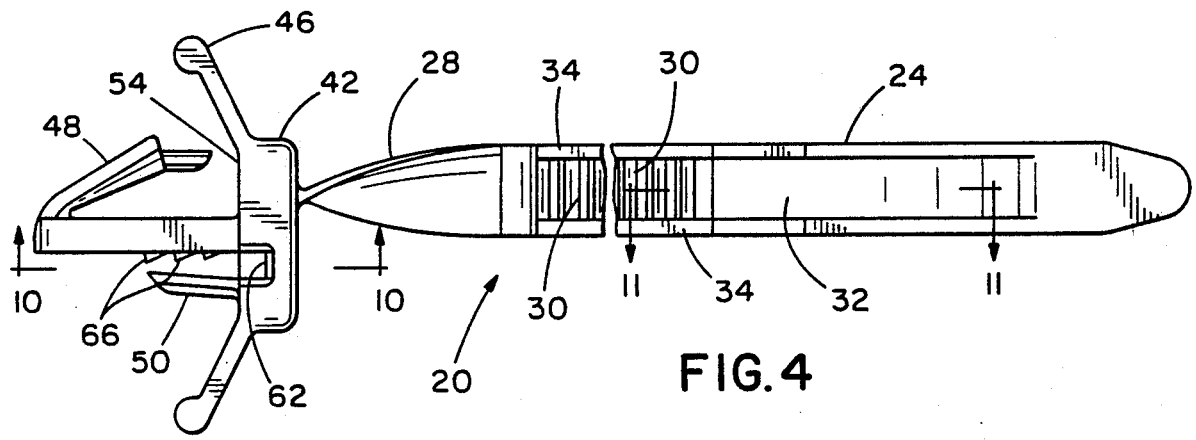
FIG. 4 is a rear view of the push mount tie of FIG. 2.
Figure 5:
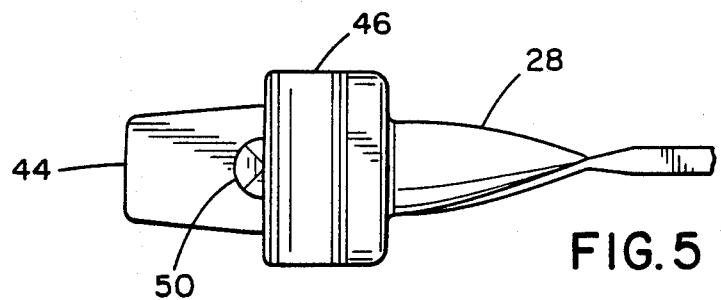
FIG. 5 is a partly cut away bottom view of the push mount tie of FIG. 2.
Figure 6:
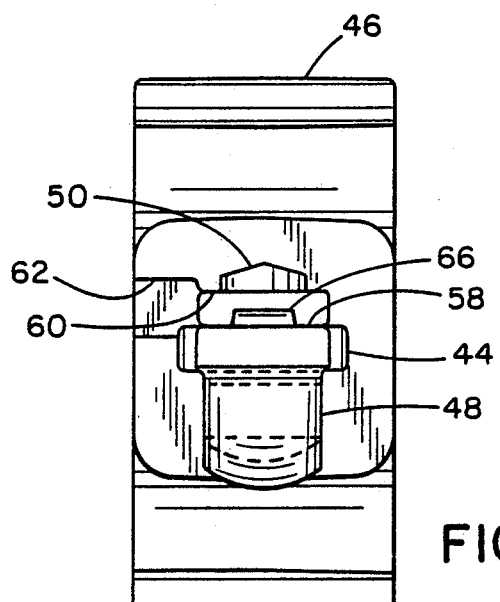
FIG. 6 is a side view of the push mount tie of FIG. 2.
Figure 15:
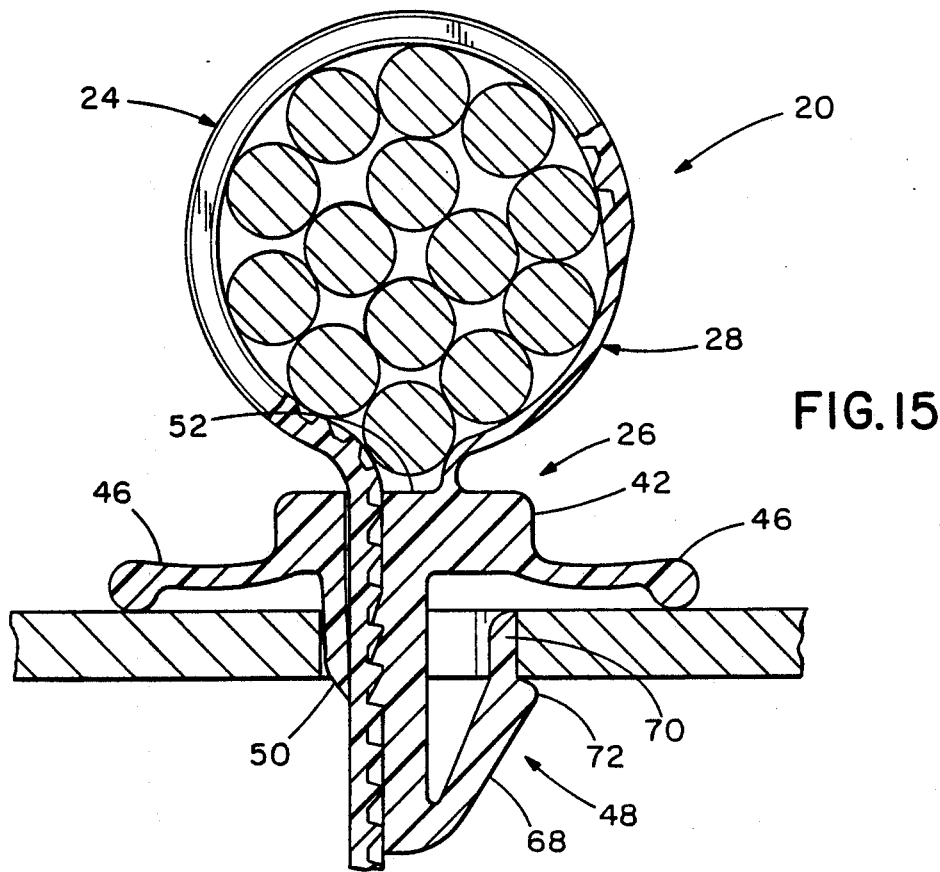
FIG. 15 is a partly sectional view of a push mount tie of FIG. 1 shown secured within an aperture in a mounting surface.
Figure 16:
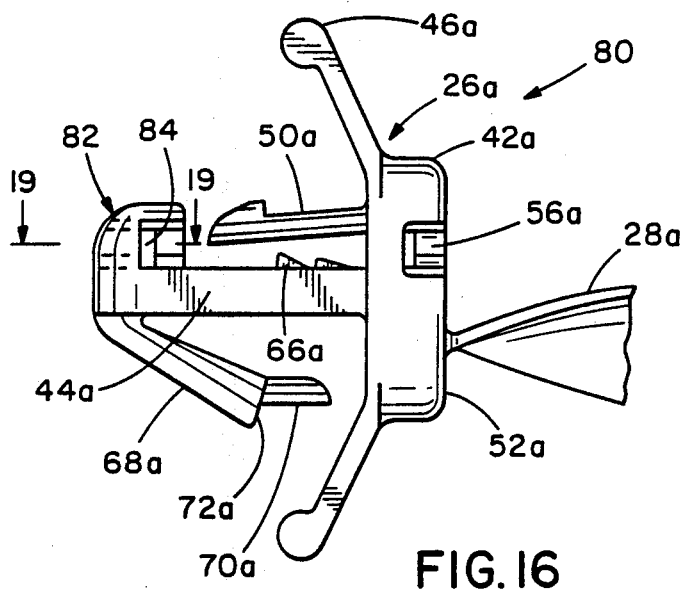
FIG. 16 is a partially cut away front view of a second embodiment of the present invention.
Figure 17:
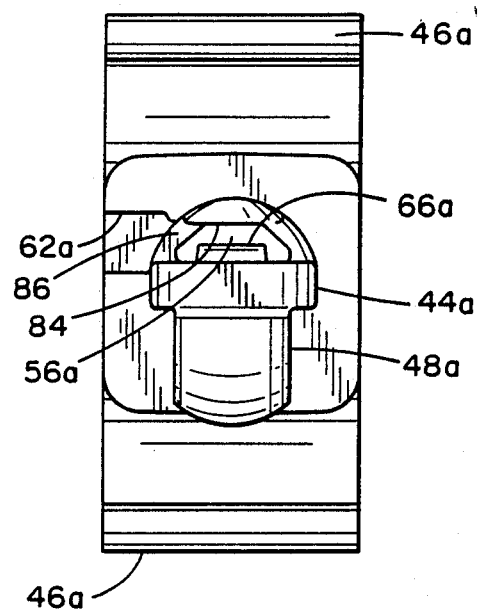
FIG. 17 is a side view of the push mount tie of FIG. 16.
Figure 18:
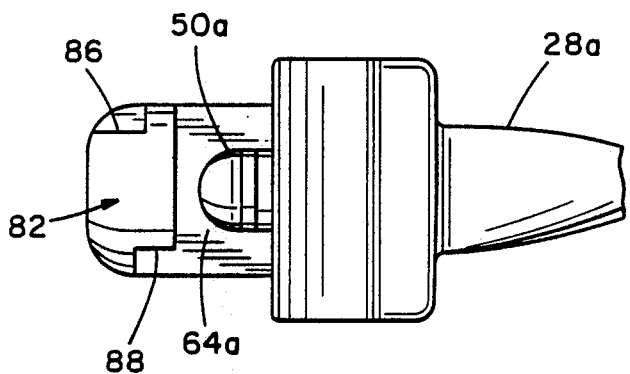
FIG. 18 is a partly cut away bottom view of the push mount tie of FIG. 16.
Figure 19:
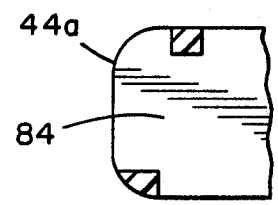
FIG. 19 is a partly cut away sectional view taken along line 19—19 of FIG. 16.
Figure 20:
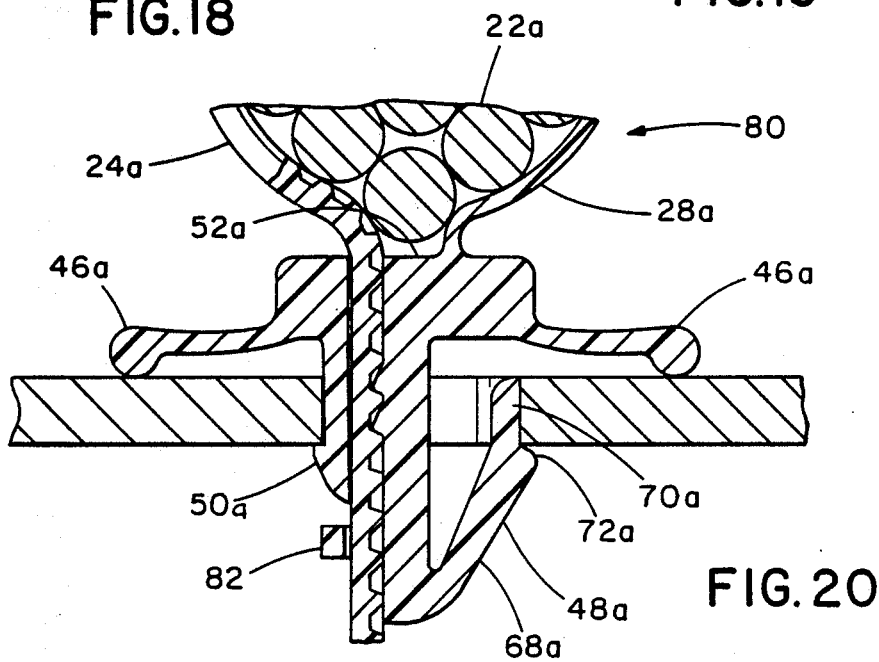
FIG. 20 is a partly cut away sectional view of the push mount tie of FIG. 16 shown secured within an aperture in a mounting surface.

A one-piece thermoplastic push mount tie fastener embodying the concept of the present invention is designated generally by the number 20 in the accompanying drawings. The preferred method of construction of push mount tie 20 is the injection molding of a suitable synthetic organic plastic resin, such as nylon, through the use of a simple two plate mold without side action. As seen in FIG. 1, push mount tie 20 is shown secured around a plurality of elongate cables 22 ready for subsequent insertion within an aperture in a mounting surface as shown in FIG. 15.

Figure 11:
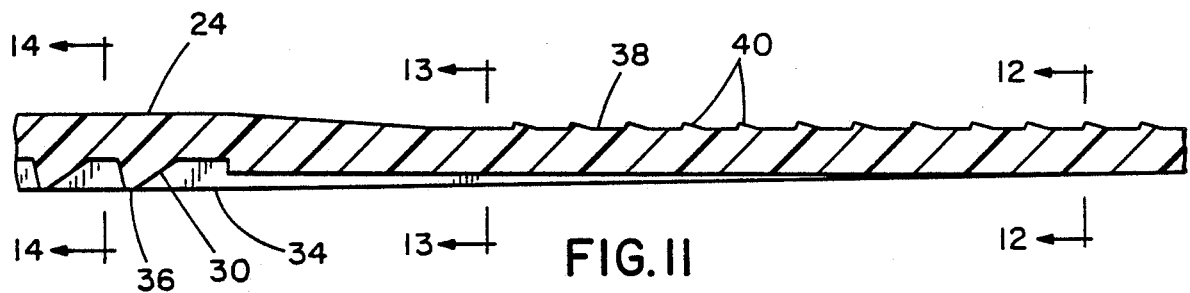
FIG. 11 is a sectional view taken along line 11—11 of FIG. 4.
Figure 12:
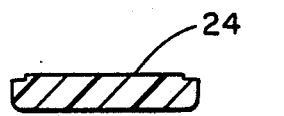
FIG. 12 is a sectional view taken along line 12—12 of FIG. 11.
Figure 13:
FIG. 13 is a sectional view taken along line 13—13 of FIG. 11.
Figure 14:
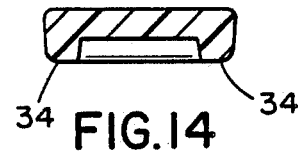
FIG. 14 is a sectional view taken along line 14—14 of FIG. 11.

Push mount tie 20 includes an elongate strap 24, a head 26, and a spiral strap portion 28. Strap 24 is formed with a plurality of strap teeth 30 formed along its length in a first planar strap surface 32 between two marginal rails 34. The crests 36 of strap teeth 30, as seen in FIG. 11, do not project above the surface of rails 34. Formed on a second planar strap surface 38 at the tip of strap 24 are a plurality of gripping ridges 40 for facilitating the manipulation and installation of push mount tie 20.

Head 26 includes means for securing a free end of strap 24 to head 26 and for securing push mount tie 20 within a mounting aperture. This means for securing includes a head plate 42, a pawl 44, a pair of outwardly and downwardly (as seen oriented in FIG. 1) projecting resilient wings 46, a barb 48 projecting radially outward from pawl 44, and a pressure pawl 50. Head plate 42 includes upper and lower planar head surfaces 52 and 54 and a strap accepting and positioning slot 56 formed through the thickness of head plate 42, slot 56 having first and second longitudinal edges 58 and 60. Side slots 62 allow slot 56 to be molded without the need for molds requiring side action.

Figure 10:
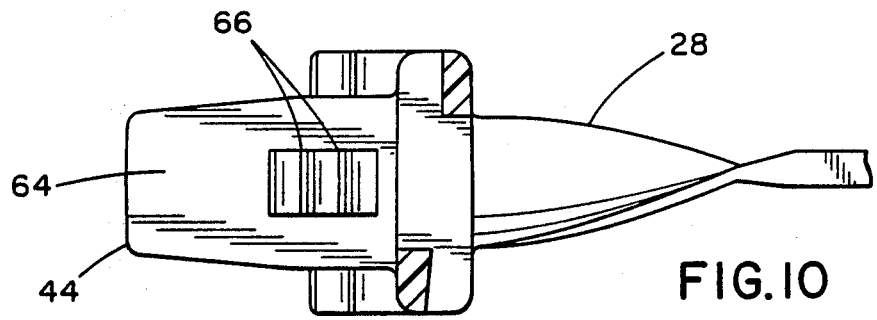
FIG. 10 is a sectional view taken along line 10—10 of FIG. 4.

Pawl 44 includes a planar strap guide surface 64 aligned with first edge 58 of slot 56; surface 64 projecting downwardly, perpendicular to lower planar surface 54. As best seen in FIG. 10, a plurality of locking teeth 66 are formed on strap guide surface 64, spaced inwardly from opposed marginal edges of pawl 44 an amount sufficient to allow rails 34 of strap 24 to engage strap guide surface 64 when the teeth 30 of strap 24 mesh with locking teeth 66.

Pressure pawl 50 projects downwardly from lower planar surface 54 parallel to pawl 44, being formed adjacent to and aligned with second longitudinal edge 60. Pressure pawl 50, as best seen in FIG. 15, is disposed opposite strap guide surface 64, positioned between an edge of a mounting aperture and strap 24 when push mount tie 20 is installed.

Barb 48 includes a resilient arm 68 formed on the distal end of pawl 44 projecting angularly, outwardly and upwardly, with respect to pawl 44 as seen in FIG. 15. An inset 70 is formed in the distal portion of arm 68, the outer surface of which is parallel to strap guide surface 64. The confluence of inset 70 and arm 68 defines an aperture engaging shoulder 72. After strap 24 is applied around a bundle of cables and secured in head 26, as seen in FIG. 1, insertion of push mount tie 20 within a mounting aperture engages the resilient barb 48 with the edge of the mounting aperture to bias the barb carrying pawl 44 into more firm engagement with the portion of strap 24 abutting the strap guide surface to more firmly secure strap 24 within head 26.

Figure 7:
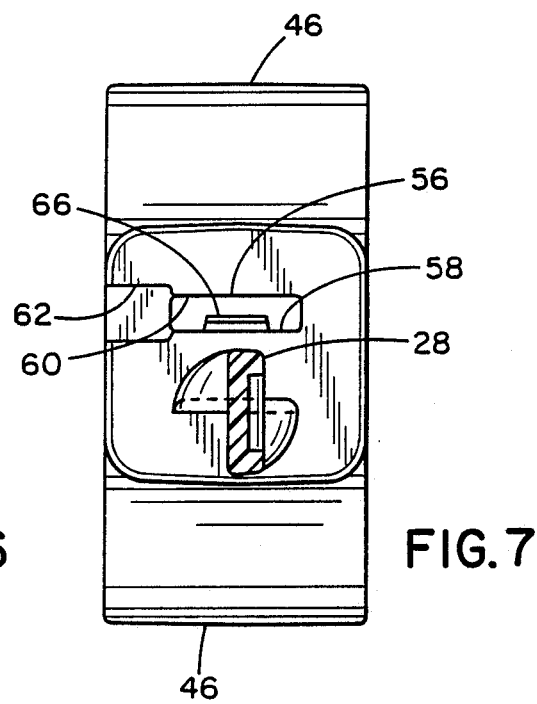
FIG. 7 is a sectional view taken along line 7—7 of FIG. 2.
Figure 8:
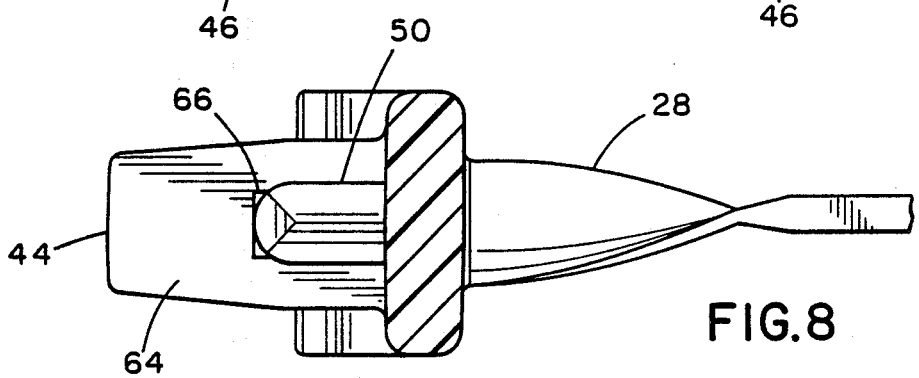
FIG. 8 is a sectional view taken along line 8—8 of FIG. 2.
Figure 9:
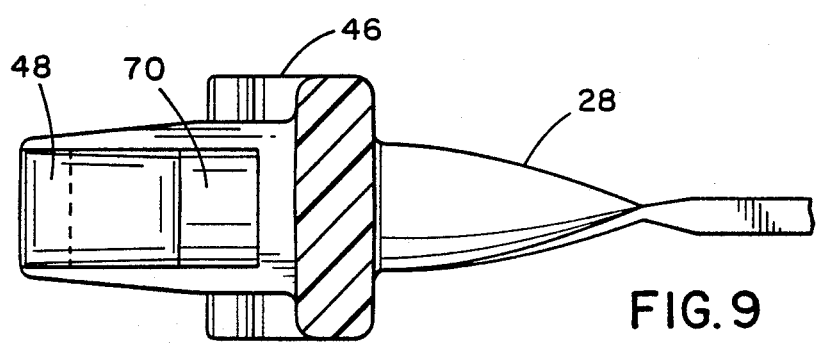
FIG. 9 is a sectional view taken along line 9—9 of FIG. 2.

Spiral strap portion 28 is molded extending from and joining one end of strap 24 to upper planar head surface 52. First planar strap surface 32 of strap 24 is formed 90 degrees from the longitudinal edges 58 or 60 of slot 56. Spiral strap portion 28 is joined to head plate 42 at an edge disposed parallel to longitudinal edges 58 or 60 of slot 56, as seen in FIG. 7; spiral strap portion 28 being molded with a spiral or twist of 90 degrees connecting strap 24 to head 26. As is apparent to one skilled in the art, the structural orientation of strap 24, spiral strap portion 28 and head 26 provide a push mount tie 20 that can be molded in a conventional, simple two plate mold without the need for complex side action molding features.

A second embodiment of the present invention is illustrated in FIGS. 16–20 which depicts a push mount tie fastener 80 in which like numerals with the addition of the letter "a" have been used to indicate parts corresponding to those described above for fastener 20. Fastener 80 includes the features of push mount fastener 20 described above, with the addition of a nose portion 82 formed on strap guide surface 64a at the free end of pawl 44a that defines a strap positioning pawl slot 84 formed in nose portion 82. After fastener 20 described above is secured around a bundle of cables 22, a possibility exists that head 26 of fastener 20 can be twisted relative to the bundle of cables 22 and strap 24 secured thereto, during manipulation of the fastener 20 and bundle of cables 22 into engagement with a mounting aperture, such that the strap 24 will shift laterally with respect to pawl 44 and strap 24 will become disengaged from locking teeth 66 of head 26. Although careful manipulation of fastener 20 and subsequent insertion into a mounting aperture will ensure that such disengagement will not occur, the added feature of strap positioning pawl slot 84 of fastener 80 removes any possibility of inadvertent disengagement.

Pawl slot 84 is formed by the convergence of side slots 86 and 88, which allow pawl slot 84 to be formed without the use of complex side action molds. Pawl slot 84 is disposed in alignment with slot 56a such that a strap 24a inserted through slot 56a will enter and pass through pawl slot 82. Pawl slot 84 secures the strap 24a relative to pawl 44a, preventing lateral movement of strap 24a relative to the pawl 44a and locking teeth 66a, thus removing any possibility that strap 24a might become disengaged from pawl 44a as a fastener 80, secured around a bundle of cables 22a, is manipulated to secure fastener 80 within a mounting aperture.

We claim:

1. A one-piece fastener for securing a plurality of elongate objects in a bundle and securing the bundle to an apertured mounting surface, comprising:
   (a) an elongate flexible strap having a plurality of teeth formed along its length in a first planar strap surface;
   (b) a head disposed transverse to the planar strap surface having an upper surface and a lower surface, said head having a strap accepting and positioning slot formed through the thickness thereof;
   (c) strap locking means formed on the head for securing a free end of the strap to the head and aperture mounting means formed on the head for securing the fastener within an aperture in the mounting surface; and
   (d) a molded spiral strap portion extending from and joining one end of the strap to the upper surface of the head whereby the structural features of the entire fastener can be molded in a conventional, simple two plate mold without side action.

2. A fastener as set forth in claim 1, wherein the strap locking means includes a pawl having a planar strap guide surface, the strap guide surface aligned with a first longitudinal edge of the slot and projecting downwardly from the lower surface of the head, the pawl including at least one tooth formed on the strap guide surface positioned to engage the teeth of the strap as the strap is inserted through the slot past the strap guide surface, and a pressure pawl formed adjacent a second longitudinal edge of the slot opposite the first longitudinal edge, the pressure pawl projecting downwardly from the lower surface of the head and being disposed opposite the strap guide surface, between an edge of a mounting aperture and the strap when the fastener is installed in the mounting aperture; and wherein the aperture mounting means includes resilient wings projecting outwardly and downwardly from the lower surface of the head and barb means formed on the pawl opposite the strap guide surface for resiliently engaging an edge of the mounting aperture to secure the fastener within a mounting aperture.

3. A fastener as set forth in claim 2, including pawl slot means for preventing disengagement of the strap from the tooth when the strap is secured within the strap locking means.

4. A fastener as set forth in claim 2, wherein the plane of the strap forms a ninety-degree angle with a longitudinal edge of the slot and the juncture of the spiral strap portion with the head is parallel to the longitudinal edge of the slot.

5. A fastener as set forth in claim 4, wherein the barb means includes a resilient arm formed on the distal end of the pawl projecting at an angle to the length of the pawl outwardly and upwardly, the arm includes an inset portion at its distal end which defines an aperture engaging shoulder, the strap includes marginally disposed planar rails extending adjacent to the plurality of strap teeth and a plurality of teeth formed on the strap guide surface spaced inwardly from marginal edges of the strap guide surface.

6. A fastener as set forth in claim 5, including pawl slot means for preventing disengagement of the strap from the tooth when the strap is secured within the strap locking means.

7. A one-piece fastener for securing a plurality of elongate objects in a bundle and securing the bundle to an apertured mounting surface, comprising:
(a) an elongate flexible strap having a plurality of teeth formed along its length in a first planar strap surface;
(b) a head disposed transverse to the planar strap surface having an upper surface and a lower surface, said head having a strap accepting and positioning slot formed through the thickness thereof;
(c) resilient wings projecting outwardly and downwardly from the lower surface of the head;
(d) a pawl having a planar strap guide surface, the strap guide surface aligned with a first longitudinal edge of the slot and projecting downwardly from the lower surface of the head, the pawl including at least one tooth formed on the strap guide surface positioned to engage the teeth of the strap as the strap is inserted through the slot past the strap guide surface, the pawl including barb means formed on the side of the pawl opposite the strap guide surface for resiliently engaging an edge of a mounting aperture to secure the fastener within the mounting aperture; and
(e) a pressure pawl formed adjacent a second longitudinal edge of the slot opposite the first longitudinal edge, the pressure pawl projecting downwardly from the lower surface of the head and being disposed opposite the strap guide surface, between an edge of a mounting aperture and the strap when the fastener is installed in the mounting aperture, and including a molded spiral strap portion extending from and joining one end of the strap to the upper surface of the head.

8. A fastener as set forth in claim 7, including pawl slot means for preventing disengagement of the strap from the tooth when the strap is secured within the head of the fastener.

9. A fastener as set forth in claim 7, wherein the plane of the strap forms a ninety-degree angle with a longitudinal edge of the slot and the juncture of the spiral strap portion with the head is parallel to the longitudinal edge of the slot.

10. A fastener as set forth in claim 7, wherein the barb means includes a resilient arm formed on the distal end of the pawl projecting at an angle to the length of the pawl outwardly and upwardly, the arm includes an inset portion at its distal end which defines an aperture engaging shoulder, the strap includes marginally disposed planar rails extending adjacent to the plurality of teeth on the strap and including a plurality of teeth formed on the strap guide surface spaced inwardly from marginal edges of the strap guide surface.

11. A fastener for securing a plurality of elongate objects in a bundle and securing the bundle to an apertured mounting surface, comprising:
(a) an elongate flexible strap having a plurality of teeth formed along its length in a first planar strap surface;
(b) a head disposed transverse to the planar strap surface having an upper surface and a lower surface, said head having a strap accepting and positioning slot formed through the thickness thereof; and
(c) a pawl having a planar strap guide surface, the strap guide surface aligned with a first longitudinal edge of the slot and projecting downwardly from the lower surface of the head, the pawl including at least one tooth formed on the strap guide surface positioned to engage the teeth of the strap as the strap is inserted through the slot past the strap guide surface, the pawl including barb means formed on the side of the pawl opposite the strap guide surface for resiliently engaging an edge of a mounting aperture to secure the fastener within the mounting aperture whereby the barb means resiliently biases the tooth on the pawl into more firm engagement with a strap abutting the strap guide surface when the barb means is resiliently engaged within a mounting aperture, wherein the barb means includes a resilient arm formed on the distal end of the pawl projecting at an angle to the length of the pawl outwardly and upwardly, the arm including an inset at its distal end which defines an aperture engaging shoulder and including a molded spiral strap portion extending from the joining one end of the strap to the upper surface of the head.

12. A fastener as set forth in claim 11, including a pressure pawl formed adjacent a second longitudinal edge of the slot opposite the first longitudinal edge, the pressure pawl projecting downwardly from the lower surface of the head and being disposed opposite the strap guide surface, between an edge of a mounting aperture and the strap when the fastener is installed in the mounting aperture.

13. A fastener as set forth in claim 12, including pawl slot means for preventing disengagement of the strap from the tooth when the strap is secured within the head of the fastener.

14. A fastener as set forth in claim 13, wherein the plane of the strap forms a ninety-degree angle with a longitudinal edge of the slot and the juncture of the spiral strap portion with the head is parallel to the longitudinal edge of the slot.

15. A fastener for securing a plurality of elongate objects in a bundle and securing the bundle to an apertured mounting surface, comprising:
(a) a head having an upper surface and a lower surface and having a strap accepting and positioning slot formed through the thickness thereof;
(b) a strap joined to an upper surface of the head by a molded spiral portion with a line of attachment of the spiral portion to the head disposed substantially parallel to a longitudinal edge of the slot on the upper surface, the strap including a plurality of teeth disposed along a planar surface of the strap with the as molded planar surface of the strap disposed substantially at a ninety degree angle relative to the longitudinal edge of the slot;
(c) strap locking means formed on the lower surface of the head for engaging at least one tooth on the strap to secure the free end of the strap to the head; and
(d) aperture mounting means formed on the lower surface of the head for securing the fastener within an aperture in the mounting surface.

16. A fastener as set forth in claim 15, wherein the strap locking means includes a pawl having a planar strap guide surface, the strap guide surface aligned with a first longitudinal edge of the slot and projecting downwardly from the lower surface of the head, the pawl including at least one tooth formed on the strap guide surface positioned to engage the teeth of the strap as the strap is inserted through the slot past the strap guide surface, and a pressure pawl formed adjacent a second longitudinal edge of the slot opposite the first longitudinal edge, the pressure pawl projecting downwardly from the lower surface of the head and being disposed opposite the strap guide surface, between an edge of a mounting aperture and the strap when the fastener is installed in the mounting aperture; and wherein the aperture mounting means includes resilient wings projecting outwardly and downwardly from the lower surface of the head and barb means formed on the pawl opposite the strap guide surface for resiliently engaging an edge of the mounting aperture to secure the fastener within a mounting aperture.

17. A fastener as set forth in claim 16, including pawl slot means for preventing disengagement of the strap from the tooth when the strap is secured within the strap locking means.

18. A fastener as set forth in claim 17, wherein the barb means includes a resilient arm formed on the distal end of the pawl projecting at an angle to the length of the pawl outwardly and upwardly, the arm includes an inset portion at its distal end which defines an aperture engaging shoulder, the strap includes marginally disposed planar rails extending adjacent to the plurality of strap teeth and a plurality of teeth formed on the strap guide surface spaced inwardly from marginal edges of the strap guide surface.

19. A one-piece fastener for securing a plurality of elongate objects in a bundle and securing the bundle to an apertured mounting surface, comprising:
(a) an elongate flexible strap having a plurality of teeth formed along its length in a first planar strap surface;
(b) a head disposed transverse to the planar strap surface having an upper surface and a lower surface, said head having a strap accepting and positioning slot formed through the thickness thereof;
(c) mounting means for securing the fastener within a mounting aperture;
(d) a pawl having a planar strap guide surface, the strap guide surface aligned with a first longitudinal edge of the slot and projecting downwardly from the lower surface of the head, the pawl including at least one tooth formed on the strap guide surface positioned to engage the teeth of the strap as the strap is inserted through the slot past the strap guide surface; and
(e) pawl slot means for accepting the strap and preventing disengagement of the strap from the tooth, the pawl slot means being formed in a free end of the pawl spaced from and in alignment with the strap accepting and positioning slot in the head, and including a molded spiral strap portion extending from and joining one end of the strap to the upper surface of the head.

20. A fastener as set forth in claim 19, wherein the mounting means includes barb means formed on the side of the pawl opposite the strap guide surface for resiliently engaging an edge of a mounting aperture to secure the fastener within the mounting aperture and resilient wings projecting outwardly and downwardly from the lower surface of the head, and including a pressure pawl formed adjacent a second longitudinal edge of the slot opposite the first longitudinal edge, the pressure pawl projecting downwardly from the lower surface of the head and being disposed opposite the strap guide surface, between an edge of a mounting aperture and the strap when the fastener is installed in the mounting aperture.

21. A fastener as set forth in claim 20, wherein the plane of the strap forms a ninety-degree angle with a longitudinal edge of the slot and the juncture of the spiral strap portion with the head is parallel to the longitudinal of the slot.

22. A fastener as set forth in claim 20, wherein the barb means includes a resilient arm formed on the distal end of the pawl projecting at an angle to the length of the pawl outwardly and upwardly, the arm includes an inset portion at its distal end which defines an aperture engaging shoulder, the strap includes marginally disposed planar rails extending adjacent to the plurality of teeth on the strap and including a plurality of teeth formed on the strap guide surface spaced inwardly from marginal edges of the strap guide surface.

* * * * *

UNITED STATES PATENT AND TRADEMARK OFFICE
CERTIFICATE OF CORRECTION

PATENT NO. : 4,919,373
DATED : April 24, 1990
INVENTOR(S) : Caveney et al.

It is certified that error appears in the above-identified patent and that said Letters Patent is hereby corrected as shown below:

Claim 11, column 6, line 40, change "the" to --and--.

Claim 21, column 8, line 40, after "tudinal" add --edge--.

Signed and Sealed this

Second Day of July, 1991

Attest:

HARRY F. MANBECK, JR.

*Attesting Officer*    *Commissioner of Patents and Trademarks*